(12) United States Patent
Bengtsson et al.

(10) Patent No.: US 10,389,107 B1
(45) Date of Patent: Aug. 20, 2019

(54) PROTECTING A TRANSFORMER COMPRISING A TAP CHANGER

(71) Applicant: ABB Schweiz AG, Baden (CH)

(72) Inventors: Tord Bengtsson, Västerås (SE); Nilanga Abeywickrama, Västerås (SE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 16/326,020

(22) PCT Filed: Aug. 15, 2017

(86) PCT No.: PCT/EP2017/070663
§ 371 (c)(1),
(2) Date: Feb. 15, 2019

(87) PCT Pub. No.: WO2018/033532
PCT Pub. Date: Feb. 22, 2018

(30) Foreign Application Priority Data

Aug. 16, 2016 (EP) .................................... 16184245

(51) Int. Cl.
*H01F 27/28* (2006.01)
*H02H 7/055* (2006.01)

(52) U.S. Cl.
CPC .................... *H02H 7/055* (2013.01)

(58) Field of Classification Search
CPC . H01F 5/00; H01F 21/12; H01F 27/28; H01F 21/08; H01F 29/02; H01F 29/04;
(Continued)

(56) References Cited

U.S. PATENT DOCUMENTS 5,408,171 A *  4/1995  Eitzmann ................... G05F 1/16
                                                    323/258
8,576,038 B2 * 11/2013  Kraemer ................. H01F 29/04
                                                    336/145
(Continued)

FOREIGN PATENT DOCUMENTS

EP      2541572 A1   1/2013
WO      0248730 A1   6/2002

OTHER PUBLICATIONS

European Search Report Application No. EP 16 18 4245 Completed: Jan. 19, 2017;dated Feb. 1, 2017 7 pages.
(Continued)

*Primary Examiner* — Adolf D Berhane
(74) *Attorney, Agent, or Firm* — Whitmyer Group LLC

(57) ABSTRACT

The invention is concerned with a protection device, method and computer program product for protecting a transformer including a tap changer and a transformer arrangement including a transformer and a protection device. The transformer has at least two magnetically coupled windings with terminals (MT1, MT2, MT3, MT4) at which power enters and exits the transformer and a tap changer having impedance elements and a switch configured to gradually connect the impedance elements when changing between two tap changer positions during a tap changing operation. The method is performed in the protection device and includes: obtaining measurements of power transmission properties (Iin, Uin, Iout, Uout) at the magnetically coupled windings, estimating energy deposited in the impedance elements during a tap changing operation based on the measured physical properties, comparing the estimated deposited energy with a failure threshold, and protecting the transformer in case the threshold is exceeded, wherein the estimating of the deposited energy includes determining the power loss of the transformer between the terminals (MT1,
(Continued)

MT2) where power enters and the terminals (MT3, MT4) where power leaves the transformer and integrating the power loss.

18 Claims, 3 Drawing Sheets

(58) Field of Classification Search
CPC .......... H01H 21/02; H01H 7/04; H01H 7/055; H01H 9/0027; H01H 9/0011; G05F 1/14; G05F 1/147
See application file for complete search history.

(56) References Cited

U.S. PATENT DOCUMENTS

| | | | |
|---|---|---|---|
| 9,123,464 B2* | 9/2015 | Von Bloh | H01F 29/04 |
| 9,679,710 B1* | 6/2017 | Schaar | H01H 9/0033 |
| 9,941,064 B2* | 4/2018 | Hammer | H01H 9/0011 |
| 2007/0225945 A1 | 9/2007 | Stenestam et al. | |
| 2018/0330862 A1* | 11/2018 | Premerlani | H01F 27/004 |

OTHER PUBLICATIONS

International Search Report and Written Opinion of the International Searching Authority Application No. PCT/EP2017/070663 Completed: Nov. 15, 2017; dated Nov. 27, 2017 13 pages.

* cited by examiner

PROTECTING A TRANSFORMER COMPRISING A TAP CHANGER

TECHNICAL FIELD

The present invention relates to a protection device, method and computer program product for protecting a transformer comprising a tap changer.

BACKGROUND

Transformers equipped with tap changers are frequently used in different types of power transmission environments, such as at 10 kV and above. A transformer that comprises a tap changer is able to change the turns ratio between the windings to thereby change voltage levels. This ability is in many systems used for controlling the delivery of power.

Transformers are generally reliable. The probability of them failing is low, such as around 1%. However, of those 1% that fail, typically 20-40% are due to failure in the tap changer.

The reason for this is that the tap changer is the only part of the transformer that has mechanically moving elements. Therefore this part of the transformer is more likely to cause a failure than the rest of the transformer.

It is therefore of interest to protect a transformer equipped with a tap changer through monitoring the tap changer.

The protection is intended to detect if the tap changer operation is carried out properly or not, because an improper tap changer operation may have catastrophic consequences. Therefore, the protection also has to be fast.

The present invention is directed towards such transformer protection.

EP 2541 572 discloses a protection arrangement for a tap changer where the current through the tap changer is detected and used to generate a current indication signal. The duration of the current indication signals is then compared with a threshold, and a fault indication signal generated if it is.

WO02/48730 discloses a protection arrangement for a tap changer, where condition diagnosing of the tap changer is made based on the actual temperature, expected heat exchange between the tap changer and ambient air and transformer, amount of heat generated by the tap changer and actual fluid temperature.

US 2007/0225945 disclosed a protection arrangement for a tap changer. The temperature of the tap changer after tap change is compared with a first threshold that is related to the tap changer temperature before the tap change operation.

SUMMARY

The present invention is thus directed towards protecting a transformer that is in the process of failing because of a tap changer fault.

This object is according to a first aspect of the present invention achieved through a protection device for protecting a transformer comprising a tap changer, the transformer having at least two magnetically coupled windings with terminals (MT1, MT2, MT3, MT4) at which power enters and exits the transformer, and the tap changer comprising impedance elements and a switch configured to gradually connect the impedance elements when changing between two tap changer positions during a tap changing operation, the protection device comprising:

a control unit operative to obtain measurements of power transmission properties at the magnetically coupled windings, estimate energy deposited in the impedance elements during a tap changing operation based on the measured power transmission properties, compare the estimated deposited energy with a failure threshold, and protect the transformer in case the threshold is exceeded, wherein the control unit (26) when estimating the deposited energy is operative to determine the power loss of the transformer between the terminals (MT1, MT2) where power enters and the terminals (MT3, MT4) where power leaves the transformer and to integrate the power loss.

The object is according to a second aspect achieved through a method of protecting a transformer comprising a tap changer, where the transformer has at least two magnetically coupled windings with terminals (MT1, MT2, MT3, MT4) at which power enters and exits the transformer and the tap changer comprises impedance elements and a switch configured to gradually connect the impedance elements when changing between two tap changer positions during a tap changing operation. The method is performed in a protection device and comprises:

obtaining measurements of power transmission properties at the magnetically coupled windings, estimating energy deposited in the impedance elements during a tap changing operation based on the measured physical properties, comparing the estimated deposited energy with a failure threshold, and protecting the transformer in case the threshold is exceeded, wherein the estimating of the deposited energy comprises determining (34) the power loss of the transformer between the terminals (MT1, MT2) where power enters and the terminals (MT3, MT4) where power leaves the transformer and integrating the power loss.

The object is according to a third aspect of the present invention achieved through a computer program product for protecting a transformer comprising a tap changer, where the transformer has at least two magnetically coupled windings with terminals (MT1, MT2, MT3, MT4) at which power enters and exits the transformer and the tap changer comprises impedance elements and a switch configured to gradually connect the impedance elements when changing between two tap changer positions during a tap changing operation, the computer program product comprising a data carrier with computer program code configured to cause a control unit of a protection device to obtain measurements of power transmission properties at the magnetically coupled windings, estimate energy deposited in the impedance elements during a tap changing operation based on the measured physical properties, compare the estimated deposited energy with a failure threshold, and protect the transformer in case the threshold is exceeded, wherein the estimating of the deposited energy comprises determining the power loss of the transformer between the terminals (MT1, MT2) where power enters and the terminals (MT3, MT4) where power leaves the transformer and integrating the power loss.

The present invention has a number of advantages. It enables a fast detection of a failed tap changer. This may furthermore be made using a minimum of additional hardware and only measuring power transmission properties that are already measured in the transformer, thereby avoiding introduction of additional sensors.

BRIEF DESCRIPTION OF THE DRAWINGS

The present invention will in the following be described with reference being made to the accompanying drawings, where FIG. 1 schematically shows a transformer equipped with a tap changer, FIG. 2 schematically shows the tap changer and one winding of the transformer in FIG. 1, FIG. 3 schematically shows power loss in the transformer occurring during tap changing operation, FIG. 4 schematically shows a control unit for controlling protection of the transformer.

DETAILED DESCRIPTION

In the following, a detailed description of preferred embodiments of the invention will be given.

Figure 1:
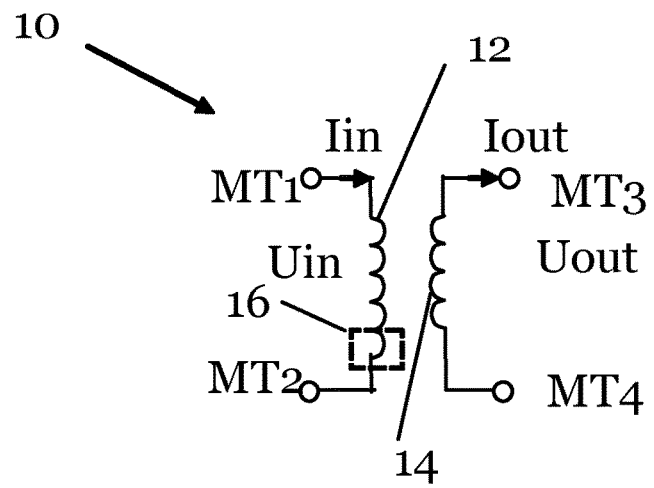

FIG. 1 shows a transformer 10 having a first winding 12 and a second winding 14 magnetically coupled to each other. These windings thus form a pair, often denoted primary and secondary windings. The first winding 12 is furthermore connected to a tap changer 16. In the figure there are also shown a number of power transmission properties of the transformer that may be measured during operation. There is an input current Iin fed into and an input voltage Uin applied over the first winding 12. There is also an output current Iout delivered from and an output voltage Uout provided by the second winding 14. The input current Iin and the input voltage Uin are measurement quantities that are measured at a first and a second measurement terminal MT1 and MT2 of the first winding 12, where the first measurement terminal MT1 is provided at a first end of the first winding 12 and the second measurement terminal MT2 at a second end of the first winding 12. The output current Iout and the output voltage Uout are measurement quantities measured at a third and a fourth measurement terminal MT3 and MT4 of the second winding 14, where the third measurement terminal MT3 is provided at a first end and the fourth measurement terminal MT4 is provided at a second end of the second winding 14. It can thus be seen that electric power enters and exits the transformer at the measurement terminals. The above described example assumes a power transfer through the transformer from the first to the second winding. Thereby the first winding 12 forms an input side and the second winding 14 an output side of the transformer 10. However, it should be realized that power may be transferred in the opposite direction, in which case the input current and input voltage would be measured at the third and fourth measurement terminals MT3 and MT4, while the output current and output voltage would be measured at the first and second measurement terminals MT1, and MT2. Then the second winding 14 would form the input side and the first winding 12 would form the output side.

The transformer shown is schematically represented. It should be realized that it may also comprise an iron core. It should also be realized that a transformer in many cases is a three-phase transformer. This means that there would be three pairs of windings. A transformer may also comprise more than one secondary winding magnetically coupled to the same primary winding. The tap changer may as an alternative also be connected to the second winding.

Figure 2:
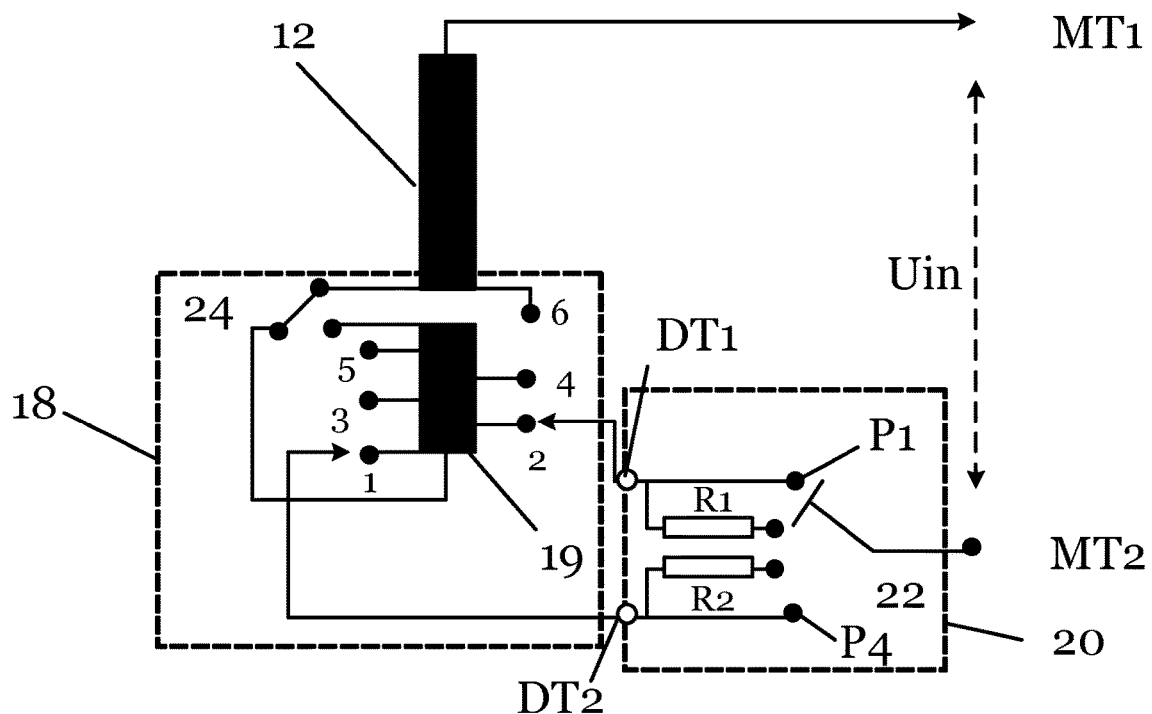

FIG. 2 schematically shows the first winding 12 together with a tap changer that comprises a regulating winding 19. The first winding has a first and a second end, with the first end connected to the first measurement terminal MT1 and the second end connectable to the regulating winding 19. The regulating winding 19 also has a first and a second end. The tap changer furthermore comprises a diverter 20 and a selector 18 that selects a number of turns of the regulating winding 19 that are to be connected to the primary winding 12.

The selector 18 has a change over switch 24 that is used to reverse the orientation of the regulating winding 19 and therefore has a first end connected to the second end of the first winding 12 and a second end moveable between two positions, a first position at the first end of the regulating winding 19 and a second position at the second end of the regulating winding 19. Each winding 14 and 19 comprises a number of turns of electrical conductor. Furthermore, the regulation winding 19 comprises a number of tap points of which six 1 2, 3, 4, 5 and 6 are shown as an example. The tap points are used for determining how many turns of the regulating winding 19 that are to be connected to the first winding by a first selector arm connected to a first diverter terminal DT1 and a second selector arm connected to a second diverter terminal DT2.

The diverter 20 in turn comprises a diverter switch 22 with a first end connected to the second measurement terminal MT2 and a second end that is connectable between four contact positions, where a first contact position P1 leads to the first diverter terminal DT1 via a first diverter arm, a second contact position leads to the first diverter terminal DT1 via an impedance element in the form of a first resistor R1, a third contact position leads to the second diverter terminal DT2 via an impedance element in the form of a second resistor R2 and a fourth contact position P4 leads directly to the second diverter terminal DT2 via a second diverter arm. The diverter 20 is provided for commutating a load between the two selector arms.

It should here be realized that this is merely one realization of a selector and diverter tap changer. There exist several other types of selector and diverter tap changers. There also exist other types of tap changers. Another type is for instance a selector-switch tap changer, which combines the selection and commutation in one movement but have a similar contacting sequence as the selector and diverter tap changer. Yet another example is a vacuum tap changer, where the contact sequence often is modified but still includes a time when power is lost in impedance elements. The shown tap changer also comprises resistors as impedance element. However, it is also known to use other types of impedance elements, such as inductors. Furthermore in the shown tap changer there are two impedance elements. It should be realized that it is also possible with fewer, such as one, or even more, such as three or four.

What is common for all these tap changers is that during a tap change there is gradual movement of a switch between two positions, which in the case of the tap changer in FIG. 2 is the diverter switch 22 moving between the first and fourth positions P1 and P4. When a tap change is desired one of the selector arms is originally connected between a tap position and the corresponding diverter terminal. As an example the first selector arm may be connected between the second tap position 2 shown in FIG. 2 and the first diverter terminal DT1 and at the same time the diverter switch 22 is in the first contact position P1. Thereby the first selector arm is loaded, i.e. a load current thus passes through the first diverter arm and into the first selector arm. A tap position that obtains a desired turns ratio change is then selected for the non-loaded selector arm, which in this example is the second selector arm. The second diverter terminal DT2 therefore connects the unloaded second selector arm to the selected tap position, which in the example of FIG. 2 is the first tap position 1. In order to commutate the load, i.e. to carry out the change of the turns ratio, the diverter switch 22 is then gradually moved from the first to the fourth contact position. In this gradual movement the diverter switch 22 first establishes contact with the first resistor R1 at the same time as there is contact with the first contact position P1. Then the diverter switch 22 breaks the contact with the first contact position P1 and the first diverter arm. The load current will now only run through the first resistor R1 to the first selector arm. Thereafter the diverter switch connects to the second resistor R2. At this point in time the load current will run through both the resistors R1 and R2 to both the first and second selector arms. There will also be a circulating current that is generated through the voltage difference between the diverter terminals DT1 and DT2. This is followed by the diverter switch 22 breaking the connection with the first resistor R1 and thereby load current is only running through the second resistor R2 to the second selector arm. Finally the diverter switch will reach the fourth contact position P2 and then the load current will run through the second diverter arm to the second selector arm. Thereby the tap change operation is completed. It can be seen that during such a movement energy is loaded or deposited into at least one impedance element and in the example of FIG. 2 in two resistors R1 and R2, which energy is consumed in the case of a resistor but only temporarily stored in the case of an inductor.

Through the above-mentioned operation of the tap changer in FIG. 2, i.e., during the gradual change between the positions P1 and P4, the impedances R1 and R2 will be connected between the measurement terminals MT3 and MT4 and therefore energy will be deposited in them. In the present example real power is lost, since the impedances are resistors. If the impedances were inductive then reactive power would instead be stored.

The instantaneous power loss may for instance be determined according to equation (1) below $$P_{loss}(t) = P^{in}(t) - P^{out} \Sigma_{phases}(U^{in}(t)I^{in}(t) - U^{out}(t)I^{out}(t)) \quad (1)$$

The equation, which is provided for a three-phase system, thereby defines the power loss of a three-phase transformer. The instantaneous power loss Ploss is thus calculated based on the power transmission property measurements obtained at the first, second, third and fourth measurement terminals MT1, MT2, MT3 and MT4 as the input voltage Uin times the input current Iin minus the output voltage Uout times the output current Iout, where three such differences are obtained, one for each phase.

It is possible to obtain the real power loss from equation (1) as an average of the instantaneous power loss in a period and the reactive power loss as an oscillation with an average of zero.

Figure 3:
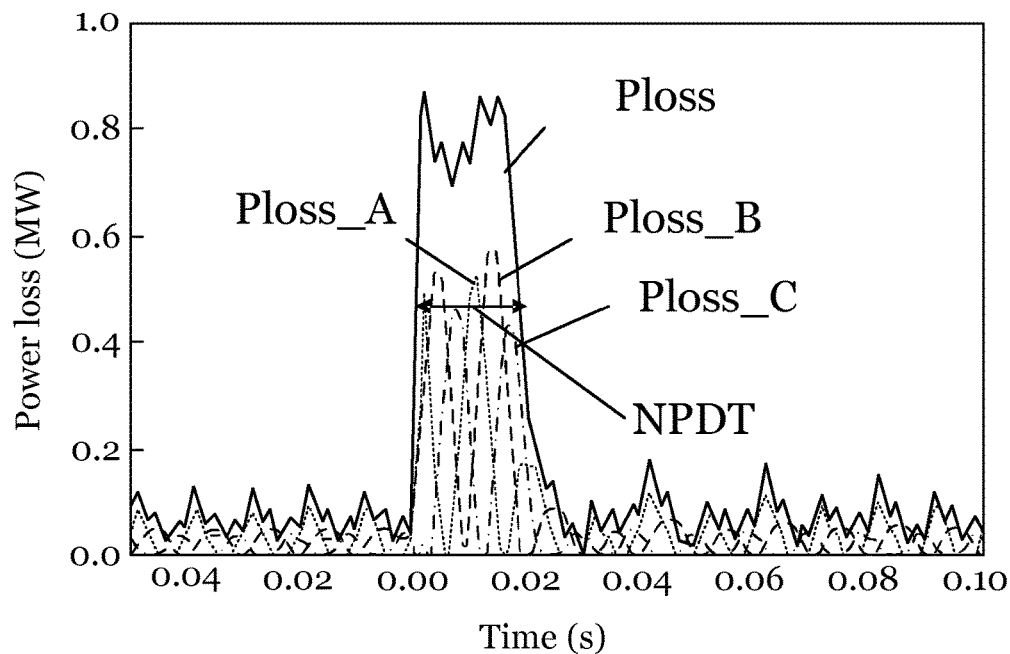

The way power loss appears at a low load of such a three-phase transformer equipped with tap changer can be seen in FIG. 3. In the figure there is shown the power loss for each phase through a simultaneous tap changing operation in all three phases. There is a power Ploss_A in a first phase, a power loss Ploss_B in a second phase and a power loss Ploss_C in a third phase. These three power losses are furthermore summed up to a total power loss Ploss, and the total power loss Ploss has the shape of a "pulse". In the figure it can be seen that the tap changing operation is carried out between times 0.00 and 0.02 s. It can be seen that the "pulse" or this interval as an example has a width of 20 ms and the width is a nominal peak duration time NPDT of an energy deposition or a nominal peak duration energy deposition time and in this interval, each phase experiences power loss. The "pulse" more particularly represents a tap changing operation when there is no fault.

In case a tap changer is operating according to plan, which is shown in FIG. 3, then the "pulse" width or interval is fairly short. However, if there is a failure with the effect that the desired connections are not completed in time then the "pulse" will get wider or the interval gets longer. This is due to the fact that the resistors would be connected to the transformer output/input a long time.

This may lead to the transformer failing by overheating, which can be very serious and for instance lead to fire in the cooling and/or insulating medium used for the transformer.

However if such a power loss due to a tap changing operation can be detected and evaluated in real time, it is possible to perform a fast protective action and disconnect the transformer quickly and thereby avoid catastrophic consequences both for the transformer and its environment. Because of this, ensuing transformer repair may also be faster and less costly.

Figure 4:
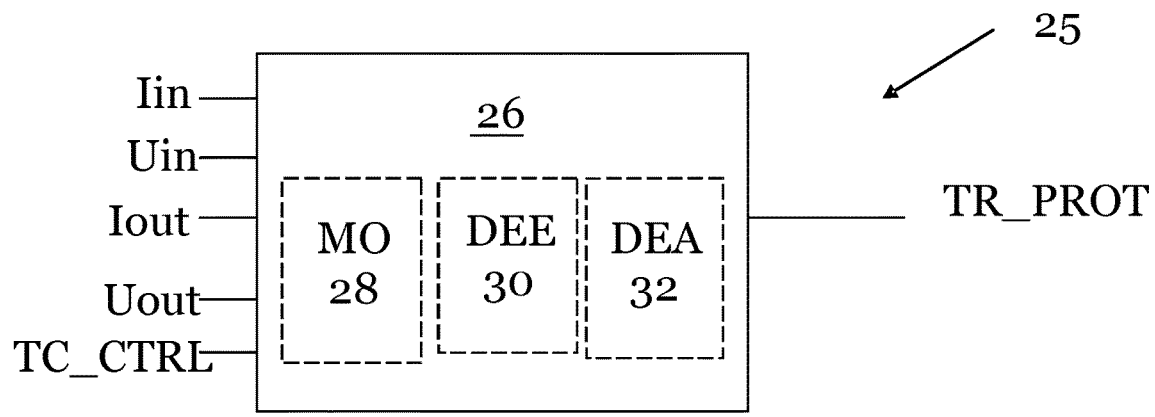

In order to provide such protection there is provided a protection device. One way of realizing the protection device 25 is shown in. FIG. 4. The protection device 25 comprises a control unit 26, which receives the measurement quantities in the form of the measured power transmission properties Iin, Uin, Iout and Uout as well as optionally also a tap changer control signal TC_CTRL, which is a control signal sent to the tap changer in order to effectuate or start the tap changing operation. Such a control signal is typically sent from a tap changer control unit, which as an example may be associated with power control of a power transmission system. The control unit 26 also delivers a protection signal TR_PROT to protection circuitry used to protect the transformer.

The control unit 26 further comprises a measurement obtaining block MO 28, a deposited energy estimating block DEE 30 and a deposited energy assessment block DEA 32.

The control unit 26 may be implemented through a computer or a processor with associated program memory comprising computer instructions implementing the above described blocks. It may also be realized through one or more dedicated components such as Application Specific Integrated Circuits (ASICSs) or Field Programmable Gate Arrays (FPGAs) realizing the blocks.

Figure 5:
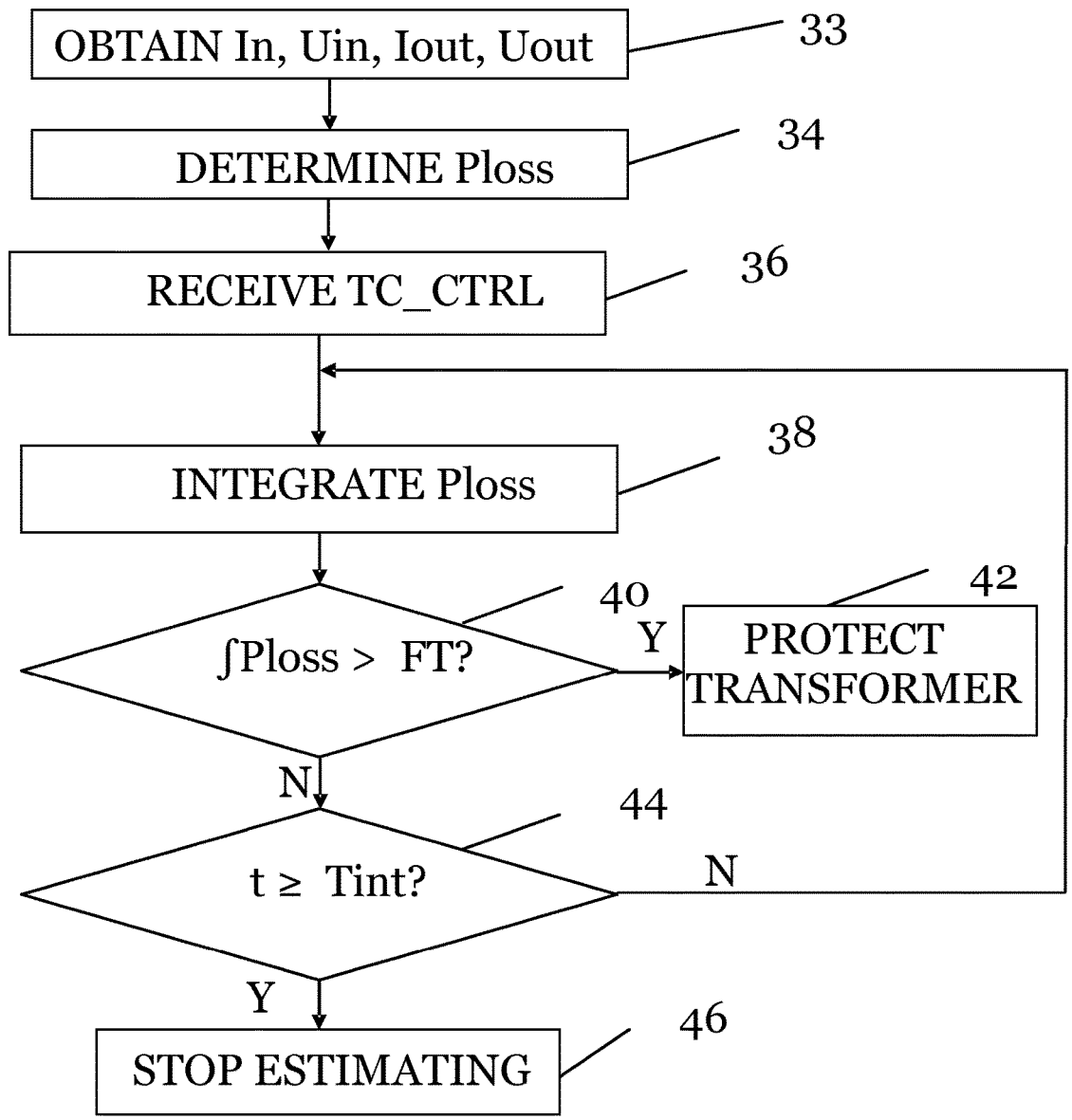
FIG. 5 shows a flow chart of method steps in one method of protecting the transformer being performed by the control unit, and FIG. 6 schematically shows a computer program product in the form of a data carrier comprising computer program code for implementing the control unit.

Now the operation of the control unit 26 in order to protect the transformer will be described with reference also being made to FIG. 5, which shows a flow chart of a number of method steps in a method of protecting the transformer 10.

The control unit 26 is operated in real time, i.e. when the transformer 10 is in operation. The transformer 10 is thus active in transferring electric power; either from the first winding 12 to the second winding 14 or from the second winding 14 to the first winding 12. In steady state operation of the transformer 10, which in this case is when the tap changer 16 has a certain setting, the losses are typically low since no resistive element is used.

During this operation the measurement obtaining block 28 may continuously obtain the measurement quantities Iin, Uin, Iout and Uout, step 33. It may do this through receiving measurements from associated sensors connected to the first, second, third and fourth measurement terminals MT1, MT2, MT3 and MT4. It may then supply these quantities to the deposited energy estimating block 30, which may in turn continuously determine the power input to and the power output from the transformer 10, which in the example given here is the power input to the first winding 12 and the power output from the second winding 14. The deposited energy estimating block 30 may more particularly determine the power loss Ploss as the difference between the power input to and the power output from the two magnetically coupled windings of each phase, step 34, for instance according to equation (1) given above. It thereby determines the power loss between the measurement terminals where power enters and the measurement terminals where power leaves the transformer.

Then the control unit 26 and in the present example the deposited energy estimating block 30 may receive an indication that a tap change is imminent, step 36, which in this example is done through receiving the tap change control signal TC_CTRL sent from a tap changer control unit to the tap changer in order to effectuate a tap change.

This indication may be a trigger for the estimating of energy that is deposited into the impedance elements R1 and R2 of the tap changer 16 during a tap changing operation, i.e. when the diverter switch 22 of the diverter 20 gradually changes from the first P1 to the fourth position P4.

Therefore, when the signal TC_CTRL is received, the deposited energy estimating block 30 starts the estimating of deposited energy.

In this embodiment the estimating is performed through integrating the continuously determined power loss.

It is possible that also the integration may be set to start triggered by the reception of the signal TC_CTRL.

The deposited energy estimating block 30 thus integrates the power loss, step 38. The deposited energy estimating block 30 may furthermore be set to perform integration within a time range Tint. This time range Tint is set in relation to the above described nominal peak duration energy deposition time NPDT. It is set such that a nominal tap changing operation will be able to finish while at the same time allowing a failure to be clearly detected. The time range should exceed the nominal peak duration energy deposition time NPDT with sufficient margin. It may for instance be set to be 10-100 times the nominal peak duration time NPDT. As one example it may be set as being 25 times NPDT. The time range thus defines how long that integration will continue as long as no failure is detected.

The integration may as an example be carried out according to $$s \leftarrow s + t_s * Ploss - \frac{s}{T_{int}/t_s} \quad (2)$$

where s is the integrating result, $t_s$ is the sampling time interval, $T_{int}$ the integrating time scale and Ploss the instantaneous power loss.

The integration results are also provided to the deposited energy assessment block 32. The operation of the deposited energy assessment block 32 may also be triggered by the signal TC_CTRL. It is furthermore a trigger for the deposited energy assessment block 32 to start performing a comparison, which comparison will be described shortly.

It can be seen through looking at equation (2) that the result of one integration s at one point in time is the integration result s of a previous point in time plus a current instantaneous power loss Ploss times a sampling time $t_s$ minus a weighted previous integrating result s, where the weight is set to the inverted minimum integrating time, $T_{int}$, in units of the sampling time interval $t_s$.

In the deposited energy assessment block 32, the integrated value is then compared with a failure threshold FT, which is an energy threshold that is higher than the energy obtained by tap changing operation at the nominal peak detection time NPDT and steady state transformer operation in the rest of the interval Tint, but low enough to safely detect a failure cased by a prolonged tap changing operation. The threshold is thus set to a level that avoids jeopardizing the transformer 10. The energy of the nominal "pulse" may be determined using the knowledge about the resistor sizes, the nominal peak duration time NPDT, the current load, the turns ratio between two adjacent tap points and the previously mentioned circulating current.

The deposited energy assessment block 32 therefore compares the estimated deposited energy, in the form of the integrated power loss, with the failure threshold FT and if the estimated deposited energy is higher than the threshold FT, step 40, then the transformer 10 is protected, step 42. This may be done through the deposited energy assessment block 32 sending a protection signal TR_PROT to the protective circuit, which may then disconnect the transformer 10 from the power transmission system in which it is used.

However, if the threshold was not exceeded, step 40, then the deposited energy assessment block 32 compares the time t that has been spent on the integration with the integration time interval Tint. If this has expired, step 44, then the tap changer is performing satisfactorily and the deposited energy assessment block 32 informs the deposited energy estimating block 30, which in turn stops the estimating of deposited energy, step 46. It is also possible that integration is stopped at the same time.

However, if the integrating time t has not yet reached the limit Tint, step 44, then the deposited energy assessment block 32 returns and again investigates the deposited energy with the threshold.

Operation is then repeated with the deposited energy assessment block 32 comparing the estimated deposited energy with the failure threshold and comparing of the integrating time with the integrating time period until either the failure threshold is exceeded or the integrating time reaches the time range Tint.

It can in this way be seen that it is possible to detect a failed tap changer. This may furthermore be made in a fast way using a minimum of additional hardware and measuring power transmission properties that are already measured in the transformer. Through the use of integration load variations are removed and thereby the deposited energy is more easily detected.

The invention can be varied in a multitude of ways. One way in which it may be varied is in the obtaining of the measurement quantities and the determining of power loss. This was above described as being performed continuously. As an alternative it is possible that these steps are only performed when an investigation of tap changing operation is carried out. These activities may thus also be triggered by the signal TC_CTRL and ended in case of expiry of the time interval Tint of the detection of failure. Another possible variation is that the estimated deposited energy is compared with a regular operation threshold and that an alarm is generated in case the estimated energy does not reach the regular operation threshold. This threshold may be set to an energy level corresponding to ordinary tap changer operation, i.e. corresponding to a "pulse" width below the nominal peak duration energy deposition time. Failure to reach the regular operation threshold would thus indicate that an ordered tap changing operation does not take place.

Another possible variation is that also integration is continuously performed. In this case the integration value at the time of reception of the signal TC_CTRL may be noted and used to adjust the failure threshold.

The protection device, which may be provided in a substation, was shown only comprising a control unit. It should be realized that the protection device may as an alternative also comprise a number of other control units for other functionality in such a substation.

Figure 6:
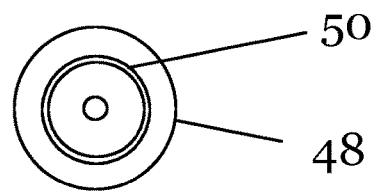

The control unit may be realized in the form of discrete components. However, as was mentioned above it may also be implemented in the form of a processor with accompanying program memory comprising computer program code that performs the desired control functionality when being run on the processor. A computer program product carrying this code can be provided as a data carrier such as one or more CD ROM discs or one or more memory sticks carrying the computer program code, which performs the above-described control functionality when being loaded into a control unit of a voltage source converter. One such data carrier in the form of a CD Rom disk 48 carrying computer program code 50 is shown in FIG. 6.

From the foregoing discussion it is evident that the present invention can be varied in a multitude of ways. It shall consequently be realized that the present invention is only to be limited by the following claims.

The invention claimed is:

1. A protection devices for protecting a transformer comprising a tap changer, said transformer having at least two magnetically coupled windings with terminals (MT1, MT2, MT3, MT4) at which power enters and exits the transformer, and the tap changer having impedance elements (R1, R2) and a switch configured to gradually connect the impedance elements when changing between two tap changer positions (P1, P4) during a tap changing operation, the protection device including:

a control unit operative to obtain measurements of power transmission properties (Iin, Uin, Iout, Uout) at the magnetically coupled windings, estimate energy deposited in the impedance elements during a tap changing operation based on the measured power transmission properties, compare the estimated deposited energy with a failure threshold, and protect the transformer in case the threshold is exceeded, wherein the control unit when estimating the deposited energy is further operative to determine the power loss of the transformer between the terminals (MT1, MT2) where power enters and the terminals (MT3, MT4) where power leaves the transformer and to integrate the power loss.

2. The protection device according to claim 1, wherein the control unit is further operative to obtain an indication (TC_CTRL) of an imminent tap changing operation and to start comparing the estimated deposited energy with the failure threshold at the point in time at which the indication is obtained.

3. The protection device according to claim 1, wherein the tap changers has a nominal peak duration energy deposition time (NPDT) and the control unit is operative to perform estimation of deposited energy in a time range Tint that exceeds the nominal peak duration energy deposition time.

4. The protection according to claim 3, wherein the time range Tint is 10-100 times the nominal peak duration energy deposition time and preferably 25 times the nominal peak duration energy deposition time.

5. The protection device according to claim 3, wherein the control unit is further operative to obtain an indication (TC_CTRL) of an imminent tap changing operation and to start comparing an estimated deposited energy with the failure threshold at the point in time at which the indication is obtained; and wherein the control unit when integrating is operative to employ the formula $$s \leftarrow s + t_s * Ploss - \frac{s}{T_{int}/t_s}$$

where s is the integrating result, $t_s$ is the sampling time instant, $P_{loss}$ the instantaneous power loss and Tint the integrating time scale.

6. The protection devices according to claim 1, wherein the control unit is further operative to compare the estimated deposited energy with a regular operation threshold and indicate if the estimated deposited energy does not reach the regular operation threshold.

7. The protection device according to claim 1, wherein the control unit is operating in real-time during operation of the transformer.

8. The protection device according to claim 2, wherein the tap changer has a nominal peak duration energy deposition time (NPDT) and the control unit is operative to perform estimation of deposited energy in a time range Tint that exceeds the nominal peak duration energy deposition time.

9. The protection device according to claim 4, wherein the control unit is further operative to obtain an indication (TC_CTRL) of an imminent tap changing operation and to start comparing the estimated deposited energy with the failure threshold at the point in time at which the indication is obtained; and wherein the control unit when integrating is operative to employ the formula $$s < -s + t_s * Ploss - \frac{s}{Tint/ts}$$

where s is the integrating result, $t_s$ is the sampling time instant, Ploss the instantaneous power loss and Tint the integrating time scale.

10. The protection device according to claim 2, wherein the control unit is further operative to compare the estimated deposited energy with a regular operation threshold and indicate if the estimated deposited energy does not reach the regular operation threshold.

11. The protection device according to claim 2 wherein the control unit is operating in real-time during operation of the transformer.

12. A method of protecting a transformers comprising a tap changer, said transformer having at least two magnetically coupled windings with terminals (MT1, MT2, MT3, MT4) at which power enters and exits the transformer and the tap changer (16) having impedance elements (R1, R2) and a switch configured to gradually connect the impedance elements when changing between two tap changer positions (P1, P4) during a tap changing operation, the method being performed in a protection devices and including:

obtaining measurements of power transmission properties (Iin, Uin, Iout, Uout) at the magnetically coupled windings, estimating energy deposited in the impedance elements during a tap changing operation based on the measured physical properties, comparing the estimated deposited energy with a failure threshold, and protecting the transformer in case the threshold is exceeded, wherein the estimating of the deposited energy includes determining the power loss of the transformer between the terminals (MT1, MT2) where power enters and the terminals (MT3, MT4) where power leaves the transformer and integrating the power loss.

13. The method according to claim 12, further comprises obtaining an indication (TC_CTRL) of an imminent tap changing operation and the comparing of the estimated deposited energy with the failure threshold is made starting from the point in time at which the indication is obtained.

14. The method according to claim 13, wherein the tap changer has a nominal peak duration energy deposition time (NPDT) and the estimating of deposited energy is performed in a time range Tint that exceeds the nominal peak duration energy deposition time.

15. The method according to claim 14, wherein the integrating time Tint is 10-100 times the nominal peak duration energy deposition time and preferably 25 times the nominal peak duration time (NPDT).

16. The method according to claim 14, wherein the integrating is performed employing $$s \leftarrow s + t_s * Ploss - \frac{s}{T_{int}/t_s}$$

where s is the integrating result, $t_s$ is the sampling time instant, Ploss the instantaneous power loss and Tint the integrating time scale.

17. The method according to claim 15, wherein the integrating is performed employing $$s \leftarrow s + t_s * Ploss - \frac{s}{T_{int}/t_s}$$

where s is the integrating result, $t_s$ is the sampling time instant, Ploss the instantaneous power loss and Tint the integrating time scale.

18. A computer program product for protecting a transformer comprising a tap changer, said transformer having at least two magnetically coupled windings with terminals (MT1, MT2, MT3, MT4) at which power enters and exits the transformer and the tap changer having impedance elements (R1, R2) and a switch configured to gradually connect the impedance elements when changing between two tap changer positions (P1, P4) during a tap changing operation, the computer program product including a data carrier with computer program code configured to cause a control unit of a protection device to obtain measurements of power transmission properties (Iin, Uin, Iout, Uout) at the magnetically coupled windings, estimate energy deposited in the impedance elements during a tap changing operation based on the measured physical properties, compare the estimated deposited energy with a failure threshold, and protect the transformer in case the threshold is exceeded, wherein the estimating of the deposited energy includes determining the power loss of the transformer between the terminals (MT1, MT2) where power enters and the terminals (MT3, MT4) where power leaves the transformer and integrating the power loss.

* * * * *